United States Patent
Jeon et al.

(10) Patent No.: US 10,607,605 B2
(45) Date of Patent: Mar. 31, 2020

(54) APPARATUS AND METHOD FOR PROCESSING CONTROL COMMAND BASED ON VOICE AGENT, AND AGENT DEVICE

(71) Applicant: Samsung Electronics Co., Ltd., Suwon-si (KR)

(72) Inventors: Joo Hyuk Jeon, Seoul (KR); Kyoung Gu Woo, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 187 days.

(21) Appl. No.: 15/270,382

(22) Filed: Sep. 20, 2016

(65) Prior Publication Data
US 2017/0103755 A1 Apr. 13, 2017

(30) Foreign Application Priority Data

Oct. 12, 2015 (KR) .................. 10-2015-0142427

(51) Int. Cl.
*G10L 21/00* (2013.01)
*G10L 15/22* (2006.01)
(Continued)

(52) U.S. Cl.
CPC .............. *G10L 15/22* (2013.01); *G06F 3/167* (2013.01); *H04L 12/282* (2013.01); *H04L 12/2821* (2013.01); *G10L 15/26* (2013.01); *G10L 15/30* (2013.01); *G10L 2015/223* (2013.01); *G10L 2015/226* (2013.01)

(58) Field of Classification Search
None
See application file for complete search history.

(56) References Cited

U.S. PATENT DOCUMENTS 7,480,619 B1   1/2009  Scott
7,634,406 B2 * 12/2009  Li .......................... G10L 15/19
                                                                704/243
(Continued)

FOREIGN PATENT DOCUMENTS

EP       2 498 250 A1      9/2012
JP      2000-310999 A     11/2000
(Continued)

OTHER PUBLICATIONS

Extended European Search Report dated Dec. 7, 2016 in counterpart European Application No. 16193347.8. (8 pages in English)

*Primary Examiner* — Richard Z Zhu
(74) *Attorney, Agent, or Firm* — Cha - Reiter, LLC

(57) ABSTRACT

Disclosed are apparatuses and methods for processing a control command for an electronic device based on a voice agent. The apparatus includes a command tagger configured to receive at least one control command for the electronic device from at least one voice agent and to tag additional information to the at least one control command, and a command executor configured to, in response to the command tagger receiving a plurality of control commands, integrate the plurality of control commands based on additional information tagged to each of the plurality of control commands and to control the electronic device based on a result of the integration.

14 Claims, 14 Drawing Sheets

(51) Int. Cl.
    *H04L 12/28*     (2006.01)
    *G06F 3/16*     (2006.01)
    *G10L 15/30*     (2013.01)
    *G10L 15/26*     (2006.01)

(56) References Cited

U.S. PATENT DOCUMENTS

| | | | |
|---|---|---|---|
| 8,340,975 B1* | 12/2012 | Rosenberger | G10L 15/22 704/270 |
| 9,270,715 B2* | 2/2016 | Zarom | G06F 9/526 |
| 9,953,647 B2* | 4/2018 | Mun | G10L 15/22 |
| 2003/0167167 A1* | 9/2003 | Gong | G10L 15/22 704/250 |
| 2010/0250529 A1* | 9/2010 | Surendran | G06Q 30/02 707/732 |
| 2011/0060587 A1 | 3/2011 | Phillips et al. | |
| 2013/0073286 A1 | 3/2013 | Bastea-Forte et al. | |
| 2013/0325759 A1* | 12/2013 | Rachevsky | G06N 99/005 706/12 |
| 2014/0118120 A1 | 5/2014 | Chen et al. | |
| 2014/0172899 A1* | 6/2014 | Hakkani-Tur | G06N 7/005 707/759 |
| 2015/0088518 A1* | 3/2015 | Kim | G06F 3/167 704/251 |
| 2016/0275952 A1* | 9/2016 | Kashtan | G10L 17/00 |

FOREIGN PATENT DOCUMENTS

| | | |
|---|---|---|
| JP | 2002-182688 A | 6/2002 |
| JP | 2006-227634 A | 8/2006 |
| JP | 2012-244238 A | 12/2012 |
| KR | 10-2010-0134469 A | 12/2010 |
| WO | WO 2014/190496 A1 | 12/2014 |

\* cited by examiner

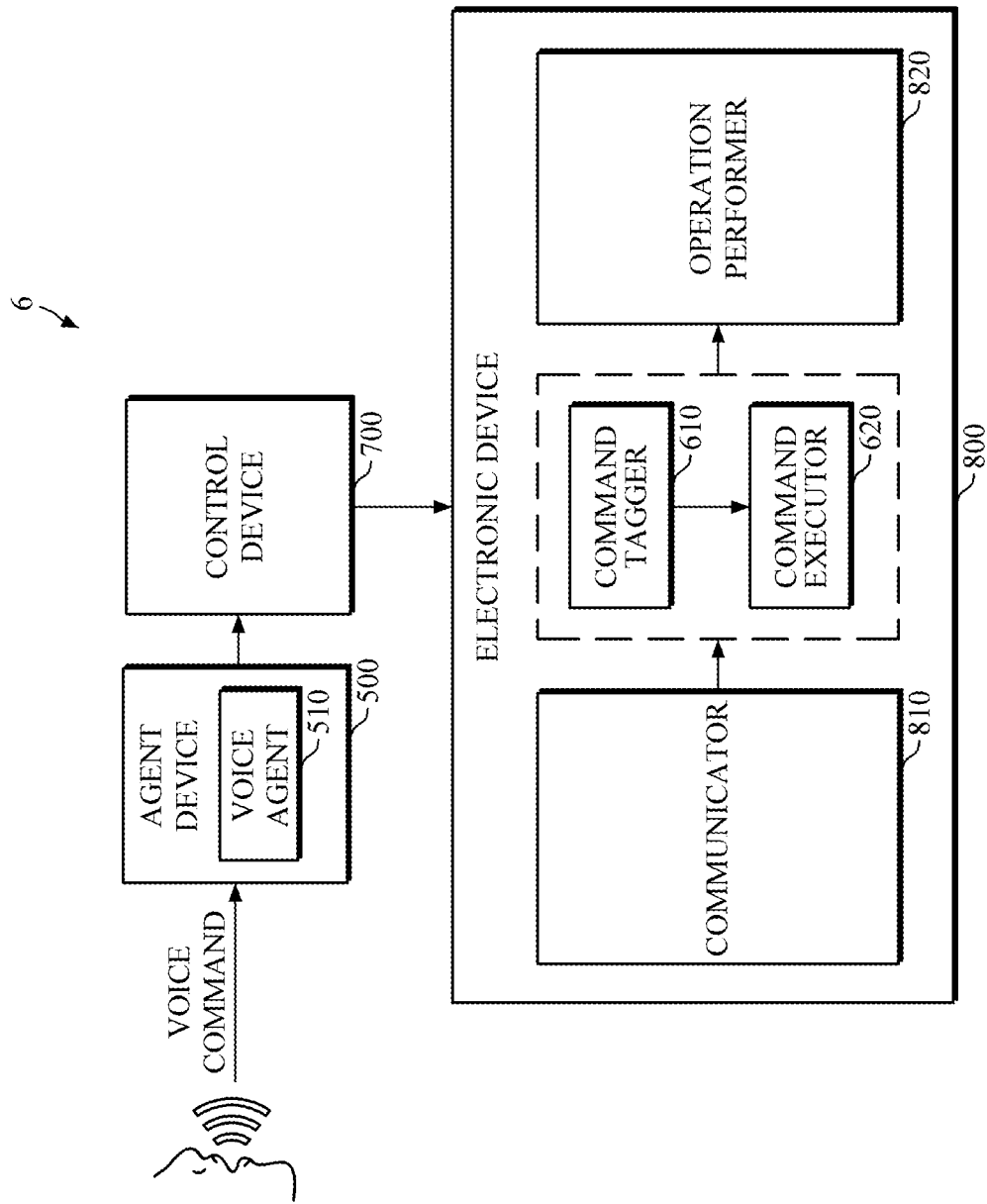

APPARATUS AND METHOD FOR PROCESSING CONTROL COMMAND BASED ON VOICE AGENT, AND AGENT DEVICE

CROSS-REFERENCE TO RELATED APPLICATION(S)

This application claims the benefit under 35 USC § 119(a) of Korean Patent Application No. 10-2015-0142427, filed on Oct. 12, 2015, in the Korean Intellectual Property Office, the entire disclosure of which is incorporated herein by reference for all purposes.

BACKGROUND

1. Field

The following description relates to a device and method for processing a control command for an electronic device that is received from a voice agent.

2. Description of Related Art

Generally, when a smart home system, a smart office system, an intelligent vehicle, or a control system of Internet of Things (IoT) devices is set-up, a voice interface is not considered, or only a case in which one voice command is entered at a time is assumed. Recently, efforts are underway to control electronic devices connected to a system by entering a command for controlling the system through a terminal provided with a voice agent function. However, multiple terminals may be provided with the voice agent function in the vicinity of a system for supporting an environment, such as smart office or smart home. In such cases, there may be redundant commands for controlling an electronic device.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In one general aspect, there is provided an apparatus for processing a control command for an electronic device, the apparatus including a processor configured to receive at least one control command for the electronic device from at least one voice agent and to tag additional information to the at least one control command, and in response to receiving a plurality of control commands, integrate the plurality of control commands based on additional information tagged to each of the plurality of control commands and to control the electronic device based on a result of the integration.

The processor may include a command tagger configured to receive at least one control command for the electronic device from at least one voice agent and to tag additional information to the at least one control command, and a command executor configured to, in response to the command tagger receiving a plurality of control commands, integrate the plurality of control commands based on additional information tagged to each of the plurality of control commands and to control the electronic device based on a result of the integration.

The received control command may be a voice prompt or a text into which the voice prompt is converted through voice recognition technology.

The additional information may include one or more of a time at which a voice corresponding to the at least one control command is uttered, a time at which the at least one control command is received from the at least one voice agent, a recognition accuracy of the voice corresponding to the at least one control command, a signal strength of the voice, a length of the at least one control command, a hash value extracted from the at least one control command, a feature value, information regarding a user, information regarding the agent device, and information regarding the electronic device.

The command executor may include a command integrator configured to integrate the plurality of control commands into one or more clusters based on the additional information tagged to each control command of the plurality of commands, and a final-command determiner configured to determine a final control command to control the electronic device based on the integration.

The command integrator may calculate similarity between the plurality of control commands and may integrate the plurality of control commands into the one or more clusters based on the calculated similarity and the tagged additional information.

The command integrator may integrate the plurality of control commands into the one or more clusters based on clustering technique including at least one of a k-means algorithm, a k-centroid algorithm, a k-median algorithm, or a purge C-means algorithm.

The command integrator may integrate the plurality of control commands into the one or more clusters based on control commands received between a time interval at the command tagger.

The final-command determiner may determine a control command corresponding to a centroid of each of the one or more clusters as the final control command.

The command executor may comprise an interactor configured to send a query about processing of the redundant command, in response to a redundant command being present in the one or more clusters, and the final-command determiner may determine the final control command based on a result of the query.

The command executor may comprises an agent selector configured to select a voice agent to interact with a user from among the plurality of voice agents, in response to the command tagger receiving the plurality of control commands from a plurality of voice agents.

The agent selector may select the voice agent to interact with a user based on any one or any combination of distances between the user and the voice agent, user preferences for the voice agent, frequencies of use of the voice agent, a voice signal strength, and voice recognition accuracy of the control commands received from the voice agent.

In another general aspect, there is provided a method of processing a control command for an electronic device, the method including receiving at least one control command from at least one voice agent, tagging additional information to the received at least one control command, and in response to a plurality of control commands being received, integrating the plurality of control commands based on additional information tagged to each of the plurality of control commands.

The integrating of the plurality of control commands may include integrating the plurality of control commands into one or more clusters based on the additional information tagged to each control command of the plurality of commands, and determining a final control command to control the electronic device based on the integration.

The integrating of the plurality of control commands into one or more clusters may include calculating similarity between the plurality of control commands and performing the integration based on the calculated similarity and the additional information.

The determining of a final control command may include determining a control command corresponding to a centroid of each of the one or more clusters as the final control command.

The integrating of the plurality of control commands may include sending a query about processing of the redundant command, in response to there being a redundant command in the one or more clusters and the determining of the final control command may include determining the final control command based on a result of the query.

The integrating of the plurality of control commands may include selecting a voice agent to interact with a user from among the plurality of voice agents, in response to receiving the plurality of control commands from a plurality of voice agents.

In another general aspect, there is provided an apparatus for processing a control command for an electronic device, the apparatus including a processor configured to receive at least one control command for an electronic device from at least one voice agent and to tag additional information to the received at least one control command, integrate the received at least one control command and a control command being executed by the electronic device based on the additional information tagged to the at least one control command, and control the electronic device based on a result of the integration.

The processor may include a command tagger configured to receive at least one control command for an electronic device from at least one voice agent and to tag additional information to the received at least one control command, and a command executor configured to integrate the received at least one control command and a control command being executed by the electronic device based on the additional information tagged to the at least one control command and to control the electronic device based on a result of the integration.

The command executor may include a command integrator configured to determine whether the received control command and the control command being executed conflict with each other, and a final-command determiner configured to determine a final control command to control the electronic device, in response to the control commands conflicting with each other.

The command executor may include a command database (DB) configured to store control commands being executed by electronic devices, and the command integrator may be configured to detect the control command being executed by the electronic device from the command DB.

The command executor may include an interactor configured to send a query about processing of the conflicting commands, in response to the determination that the control commands conflict with each other, and the final-command determiner may be configured to determines the final control command based on a result of the query.

The command executor may include a policy DB configured to store policies for selecting a voice agent, and an agent selector configured to select a voice agent to interact with a user by referencing the policy DB.

In another general aspect, there is provided an agent device including a voice agent configured to transfer the entered control command to a command tagger, in response to a voice-type control command for controlling an electronic device being entered, and the command tagger configured to tag additional information to the transferred control command, the additional information being used to integrate one or more control commands for controlling the electronic device.

The agent device may include a communicator configured to send the control command with the tagged additional information to a control command processing device that integrates and processes the one or more control commands for controlling the electronic device.

The voice agent may be configured to convert the result of processing the control command into audio and to output the audio, in response to receiving the processed control command from the control command processing device.

The processed control command may include at least one of a query about processing of a plurality of redundant commands for controlling the electronic device or a result of executing the control command.

The voice agent may be further configured to collect at least one of a time at which the control command is uttered, a signal strength of the voice, information regarding the user, or a recognition accuracy of the voice and to transfer the collected information to the command tagger, in response the control command being entered.

Other features and aspects will be apparent from the following detailed description, the drawings, and the claims.

BRIEF DESCRIPTION OF THE DRAWINGS

FIGS. 5 to 10 show examples of a network control system to which a control command processing technique is applied.

Figure 1:
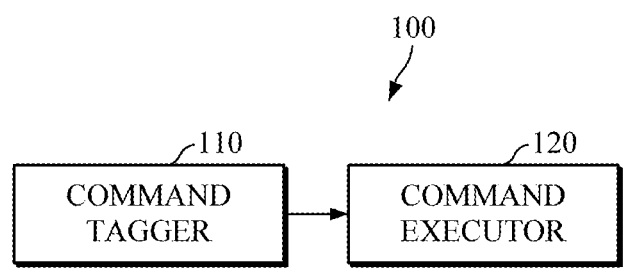
FIG. 1 is a diagram of an apparatus for processing a control command according to an embodiment.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

FIG. 1 is a diagram of an apparatus for processing a control command according to an embodiment.

A control command processing device 100 according to an embodiment may be applied to a control system for controlling various electronic devices (hereinafter referred to as a "network control system") through a voice agent in various manners. In an example, control command processing device 100 may prevent an electronic device from executing commands transferred from the voice agent. In an example, the electronic device is one of various devices that perform final operations in a network control system according to a user's command. The electronic device may include smart home/office devices such as, for example, an optical disc player, a DVD player, a Blue-ray player, a setup box, robot cleaners, a health-care device, a mobile robot, a home appliance, a refrigerator, a television (TV), content players, communication systems, image processing systems, graphics processing systems, a gas stove, a dish washer, a door lock, a fire detector, a closed-circuit television (CCTV), an air conditioner, a boiler, mobile phone, a cellular phone, a smart phone, a wearable smart device (such as, for example, a ring, a watch, a pair of glasses, glasses-type device, a bracelet, an ankle bracket, a belt, a necklace, an earring, a headband, a helmet, a device embedded in the cloths), a personal computer (PC), a laptop, a notebook, a subnotebook, a netbook, or an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, a vehicle, and various other Internet of Things (IoT) devices that are controlled through a network.

Referring to FIG. 1, the control command processing apparatus 100 may include a command tagger 110 and a command executor 120. In an example, the command tagger 110 and the command executor 120 is implemented as one module or installed in one hardware device. In another example, the command tagger 110 and the command executor 120 is installed in separate hardware devices. For example, the command tagger 110 may be installed in an agent device equipped with a voice agent, and the command executor 120 may be installed in a separate device, a control device for controlling an electronic device, or the electronic device itself.

The command tagger 110 may receive a command for controlling the electronic device (hereinafter referred to as a control command) from the voice agent. In an example, the voice agent may be installed in various agent devices such as a smartphone, a smart pad, a tablet personal computer (PC), a notebook PC, a desktop PC, a health-care device, a mobile robot, a wearable device, or any of the smart home/office devices disclosed above.

When a user utters a voice to control an electronic device, the voice agent may receive the voice of the user and transfer the voice to the command tagger 110 as the control command. In another example, the voice agent may recognize the voice received from the user by utilizing embedded voice recognition technology and transfer text that is output as a result of the recognition to the command tagger 110 as the control command.

When the control command is received from the voice agent, the command tagger 110 may tag additional information to the received control command. In an example, the additional information may include information such as, for example, a time at which the user uttered the voice, a time at which the command tagger 110 received the control command from the voice agent, a recognition accuracy of the voice uttered by the user, a signal strength of the voice uttered by the user, data length of the received control command, a hash value extracted from the received control command, a feature value acquired from an external module, information regarding the user who uttered the voice, information regarding the agent device equipped with the voice agent, information regarding an electronic device to be controlled. The examples of the additional information described above are only non-exhaustive illustrations, and various other types of information are considered to be well within the scope of the present disclosure.

For example, the command tagger 110 may receive the additional information from the voice agent in addition to the control command. When the voice is received from the user, the voice agent may acquire information such as, for example, the time at which the voice is received, the signal strength of the received voice, the information regarding the user who entered the voice, the information regarding the agent device. In an example, when voice recognition is performed on the received voice, the voice agent may acquire information related to an accuracy of the voice recognition and transfer the acquired accuracy to the command tagger 110 so that the acquired information may be utilized as the additional information to be tagged to the control command.

In an example, when the control command is received from the voice agent, the command tagger 110 may acquire the additional information using the received control command. For example, the command tagger 110 may acquire the time at which the control command is received as the additional information. When the received control command is a text command, the command tagger 110 may extract the information such as, for example, information regarding the electronic device to be controlled, the data length of the control command, the hash value using a text analysis technique. Also, the command tagger 110 may acquire a feature vector value (e.g., word embedding) through another external module as additional information.

In an example, when the control command is received from the voice agent, the command tagger 110 may acquire the additional information using the received control command.

The command tagger 110 may receive a plurality of control commands from the voice agent. As an example, when there are a plurality of users in the vicinity of the voice agent, the plurality of users may utter voice comands at the same time. In this case, the voice agent may receive the voice commands and transfer the plurality of control commands to the command tagger 110. As another example, when the command tagger 110 is connected with a plurality of voice agents, the plurality of voice agents may receive a voice uttered by one user and transfer a plurality of control command corresponding to the received voice to the command tagger 110.

When the command tagger 110 tags the additional information to the control command, the command executor 120 may control the electronic device on the basis of the control command having the tagged additional information.

In an example, when there is a plurality of control commands directed to control the electronic device, the command executor 120 may integrate the plurality of control commands using the additional information tagged to the plurality of control commands. In addition, the command executor 120 may determine a final control command to control the electronic device using a result of the integration and may control the final control command to be executed by the electronic device.

In another example, when a control command is being executed by an electronic device, the command executor 120 may determine whether a received control command conflicts with the control command being executed using additional information tagged to the received control command and may perform appropriate processing according to a result of the determination. Various embodiments of the command executor 120 will be described below in detail with reference to FIGS. 2A to 2D.

FIGS. 2A to 2D are diagrams showing examples of the command executor 120 of FIG. 1. Elements having the same reference number in FIGS. 2A to 2D refer to the same element.

Figure 2A:
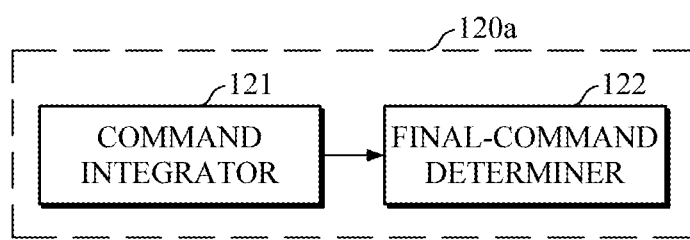
FIGS. 2A to 2D are diagrams showing examples of a command executor 120 of FIG. 1.

Referring to FIG. 2A, a command executor 120a according to an embodiment may include a command integrator 121 and a final-command determiner 122.

When control commands are received from a command tagger 110, the command integrator 121 may check additional information tagged to the received control commands and may integrate the control commands using the additional information.

For example, when a plurality of control commands are received from the command tagger 110, the command integrator 121 may integrate the control commands for each cluster using the additional information tagged to the control commands. In this case, the command integrator 121 may classify the plurality of commands into one or more clusters by utilizing various clustering techniques such as, for example, a K-means algorithm, a k-centroid algorithm, a k-median algorithm, and a purge C-means algorithm. The command integrator 121 may integrate the classified commands.

In an example, the command integrator 121 may check a user utterance time from the additional information tagged to the control commands and may cluster the commands at a predetermined time interval (e.g., every second). In another example, the command integrator 121 may check user information from the additional information of the control commands and may classify control commands that are entered for a predetermined time into different clusters based on the user entering the control commands. In another example, the command integrator 121 may perform the classification for each electronic device to be controlled or using information regarding data length of the command. In this case, the command integrator 121 may cluster the plurality of control commands in combinations of two or more pieces of additional information. In another example, the command integrator 121 may calculate similarity between the entered control commands using a similarity calculation algorithm such as, for example, an edit distance algorithm and may cluster the control commands on the basis of the calculated similarity.

The final-command determiner 122 may determine a final control command to control the electronic device among the control commands integrated for each cluster by the command integrator 121.

For example, when there are a plurality of control commands for each cluster, the final-command determiner 122 may determine that the control commands are redundant commands and may determine only one command to actually control the electronic device among the plurality of control commands as the final control command.

In an example, when the final control command is determined in a cluster, which is classified using an algorithm, such as, for example, K-means algorithm, the final-command determiner 122 may determine a command corresponding to a centroid of the cluster as the final control command.

In another example, the final-command determiner 122 may determine a command having the strongest signal strength of the uttered voice, a command having the highest voice recognition accuracy, and a control command having the latest time at which the user uttered the voice from the cluster as the final control command. The examples described above are non-exhaustive, and other criterion for determining the final control command are considered to be well within the scope of the present disclosure.

In an example, the final-command determiner 122 may prevent a plurality of control commands from being transferred to a specific electronic device at the same time and being redundantly executed by sending the determined final control command to a control device to execute the final control command in the electronic device.

For example, a control command "increase the living-room temperature by 1 degree" uttered by a user at 19:00 may be transferred from voice agents of a smartphone and a smart watch that are in the vicinity of the user to the command tagger at 19:02:32 and 19:02:33, respectively. When information regarding a time at which the control command is received is tagged to the control command by the command tagger, the command integrator 121 may integrate the control commands into one cluster because the times at which the control commands are received are within a predetermined time interval (e.g., one second). In this case, the final-command determiner 122 may determine that two control commands included in the cluster are redundant and may determine one of the two control commands as the final control command.

Figure 2B:
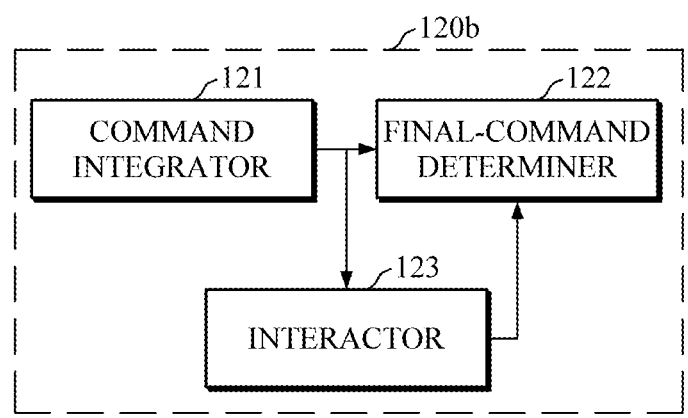

Referring to FIG. 2B, a command executor 120b according to an embodiment may include a command integrator 121, a final-command determiner 122, and an interactor 123. In addition to the description of FIG. 2B below, the above descriptions of FIGS. 1-2A, are also applicable to FIG. 2B, and are incorporated herein by reference. For example, the command integrator 121 and the final-command determiner 122 have been described above, and their detailed description will be omitted.

The interactor 123 may perform various interactions with a user in relation to the processing of a control command.

In an example, a plurality of control commands are integrated by the command integrator 121. When it is determined that control commands for any electronic device are redundant, the interactor 123 may create a query about the processing of the redundancy, show the query to the user, and receive a response to the query from the user. In this case, the final-command determiner 122 may determine the final control command on the basis of the user's response.

In another example, the interactor 123 may provide the user with various operations performed while the determined final control command is executed by the electronic device and a result of the execution of the final control command. For example, the interactor 123 may inform the user of the determined final control command, inform the user of a result of transmission of the final control command to a control device, inform the user of whether the final control command is normally executed, and provide the user with information about a cause when the final control command is not normally executed.

Figure 2C:
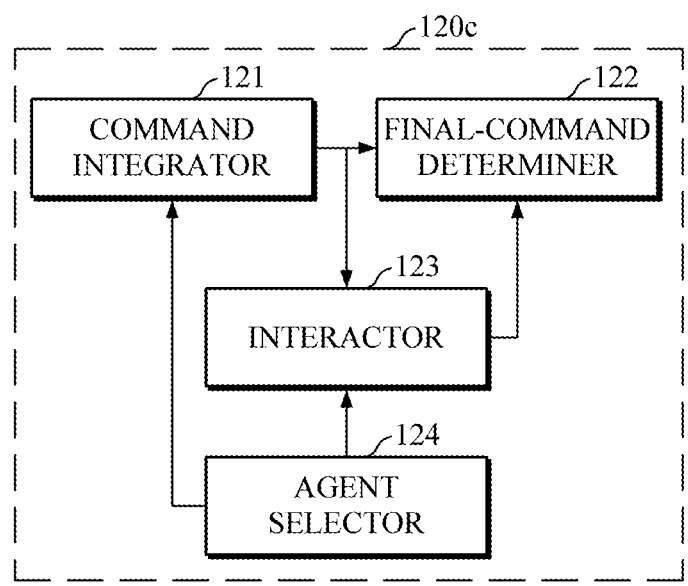

Referring to FIG. 2C, a command executor 120c according to an embodiment may include a command integrator 121, a final-command determiner 122, an interactor 123, and an agent selector 124. In addition to the description of FIG. 2C below, the above descriptions of FIGS. 1-2B, are also applicable to FIG. 2C, and are incorporated herein by reference. For example, the command integrator 121, the final-command determiner 122, and an interactor 123 have been described above, and their detailed description will be omitted.

In a network control system environment in which an electronic device is controlled using a voice agent, many voice agents may be present in the vicinity of a user. For example, when the user enters a voice corresponding to a control command, a plurality of agent devices such as a smartphone, a smart pad, a smart watch, and smart glasses equipped with voice agents may be operating in the vicinity of the user. In another example, a plurality of voice agents may be installed in one agent device to operate at the same time.

When many voice agents are present in the vicinity of the user, the agent selector 124 may select one or more voice agents so that the interactor 123 may interact with the user. In this example, the agent selector 124 may select an agent to interact with the user in consideration of distances between the user and agent devices, user preferences for the agent devices, the frequencies of use of the agent devices, or a voice signal strength and voice recognition accuracy of the control commands received from the agent devices.

According to an example, when control commands are transferred from a plurality of agent devices, the agent selector 124 may select an agent device to perform an interaction from among the agent devices before the control commands are integrated by the command integrator 121. In an example, the agent selector 124 may select an agent device having the strongest voice signal or an agent device having the highest voice recognition accuracy as the agent device to perform the interaction, but is not limited thereto. In this case, the command integrator 121 may integrate only control commands transferred from the selected agent device.

According to another example, after a plurality of control commands transferred from a plurality of agent devices are integrated by the command integrator 121, the agent selector 124 may select an agent device to perform an interaction on the basis of a result of the integration. For example, when the integration result is that there are redundant commands, the agent selector 124 may select an agent device positioned closest to the current position of the user in order to send a query about the processing of the redundant commands to the user and receive a response to the query from the user.

The interactor 123 may interact with the user through the agent device selected by the agent selector 124.

Figure 2D:
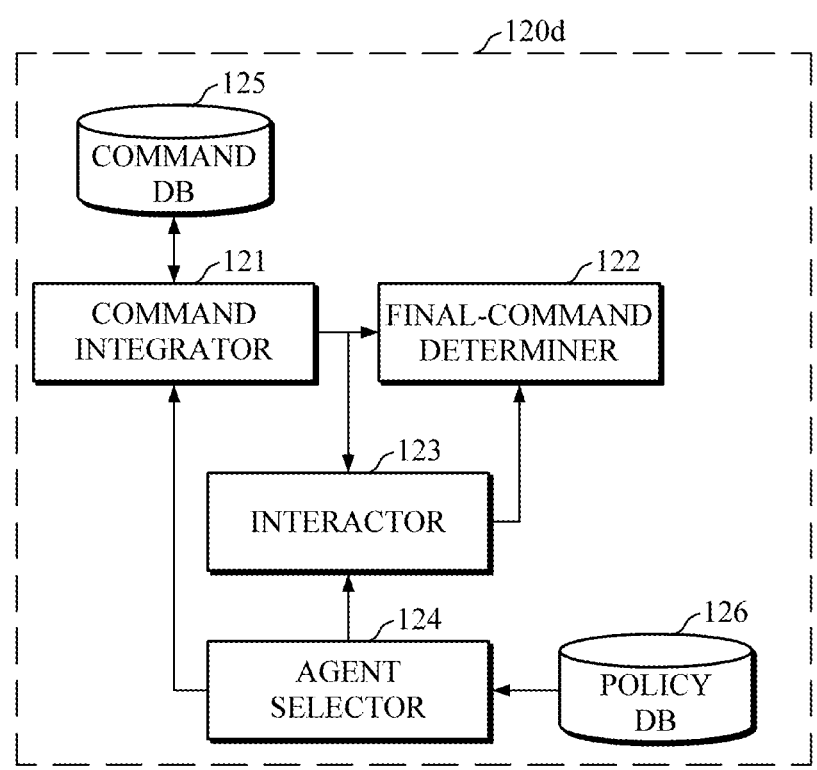

The command executor 120c of FIG. 2C may be expanded as shown in FIG. 2D. Referring to FIG. 2D, a command executor 120d may further include a command database (DB) 125 and/or a policy DB 126, in addition to the elements 121, 122, 123, and 124 of FIG. 2C. A control command being executed or to be executed for each electronic device, for example, a control command to be periodically executed, is prestored in the command database (DB) 125. Various criteria for selecting an agent to perform an interaction from among a plurality of voice agents are prestored in the policy DB 126.

When a control command is received from the command tagger 110, the command integrator 121 may check whether there is a control command being executed by referencing the command DB 125. In an example, the command integrator 121 may check an electronic device to be controlled, a time at which the control command is received, and a time at which the received control command is executed from additional information tagged to the control command and may check whether there is a conflicting control command in the command DB 125 on the basis of the checked information.

For example, when a control command "increase the living-room temperature by one degree" is received from a user at 12:10, the command integrator 121 may check the additional information to check that an electronic device to be controlled is a "boiler" and may check whether there is a control command being executed for the boiler in the command DB 125. In this case, when a control command "maintain the living-room temperature at 20 degrees Celsius from 12:00." is stored in the command DB 125, the command integrator 121 may integrate the control command entered by the user and the control command stored in the command DB 125 to determine that the control commands conflict with each other.

In this case, when a plurality of control commands are entered through a voice agent, the command integrator 121 may integrate each of the control commands and the command stored in the command DB 125 to determine whether the commands are redundant or conflicts with each other.

The final-command determiner 122 may determine a final control command to be executed by an electronic device from among the control commands that are redundant or conflict with each other. In this case, as described above, the interactor 123 may send a query about the processing of the redundant or conflicting commands to the user and may receive a response to the query from the user. For example, the interactor 123 may send a query such as "the living-room temperature is maintained at 20 degrees Celsius from 12:00. Do you want to increase the temperature to 21 degrees Celsius only this time?" to the user. The final-command determiner 122 may determine one command as the final control command on the basis of the user's response.

As described above, the agent selector 124 may select an agent that is used by the interactor 123 to interact with the user. In an example, the agent selector 124 may refer to the policy DB 126. In an example, criteria for selecting an agent device according to one or more combinations of information such as, for example, information regarding an agent device preferred or frequently used by the user by date/by time period/by places, the current position of the user, the current time, the number of agent devices operating may be stored in the policy DB 126. However, embodiments are not limited thereto, and various other criteria may be used and stored depending on various situations.

For example, when a criterion is set in the policy DB 126 to select an agent in consideration of the current position of the user and a use frequency, and the user is in a main room, the agent selector 124 may select a smartphone that is most frequently used by the user in the main room as the agent device. In another example, when a criteria is set in the policy DB 124 to select an agent on the basis of the current position of the user and a distance between agent devices, the agent selector 124 may find out the current positions of the user and the agent devices and select an agent device that is positioned closest to the current position of the user.

Figure 3A:
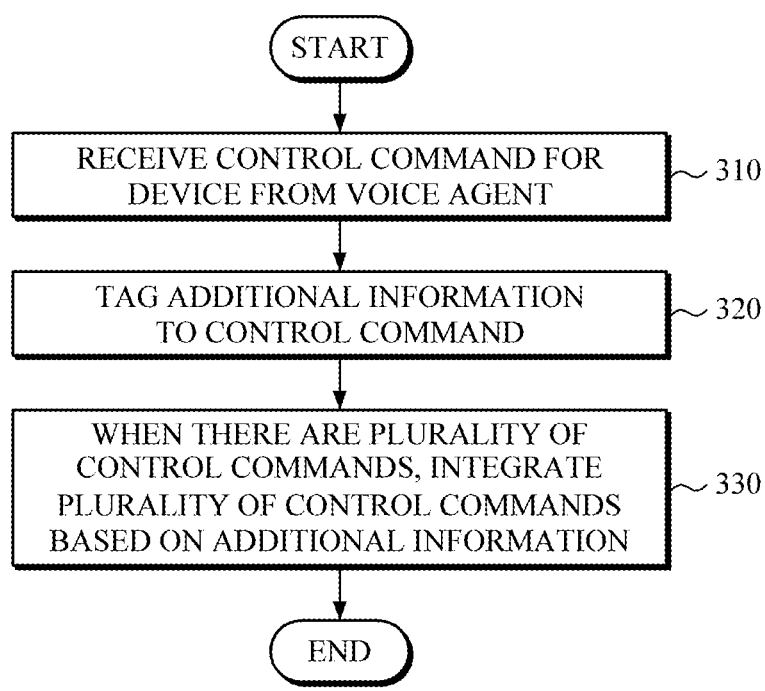
FIGS. 3A and 3B are diagrams showing a method of processing a control command according to an embodiment.

FIG. 3A is a diagram showing a method of processing a control command for an electronic device on the basis of a voice agent according to an embodiment. The operations in FIG. 3A may be performed in the sequence and manner as shown, although the order of some operations may be changed or some of the operations omitted without departing from the spirit and scope of the illustrative examples described. Many of the operations shown in FIG. 3A may be performed in parallel or concurrently. In addition to the description of FIG. 3A below, the above descriptions of FIGS. 1-2D, are also applicable to FIG. 3A, and are incorporated herein by reference. Thus, the above description may not be repeated here.

Referring to FIG. 3A, in 310, the control command processing apparatus 100 may receive a control command from a voice agent. In an example, the voice agent may transfer the control command entered from a user. In another example, when the voice agent is equipped with voice recognition technology, the voice agent may recognize the voice of the user through the voice recognition technology and may transfer text that is output according to a result of the recognition as the control command.

In an example, the control command processing device 100 may receive a plurality of control commands. For example, one agent may receive and then transfer voices that are entered by several users at the same time. In another example, several nearby voice agents may receive and then transfer a voice entered by one user.

In 320, when the control command is received from the voice agent, the control command processing device 100 may tag additional information to the received control command. The additional information is the same as that described above, and the control command processing device 100 may acquire necessary additional information from the voice agent or an external module or may extract the necessary additional information by analyzing the control command.

In 330, when there are a plurality of control commands, the control command processing device 100 may integrate the plurality of control commands using additional information tagged to the control commands.

Figure 3B:
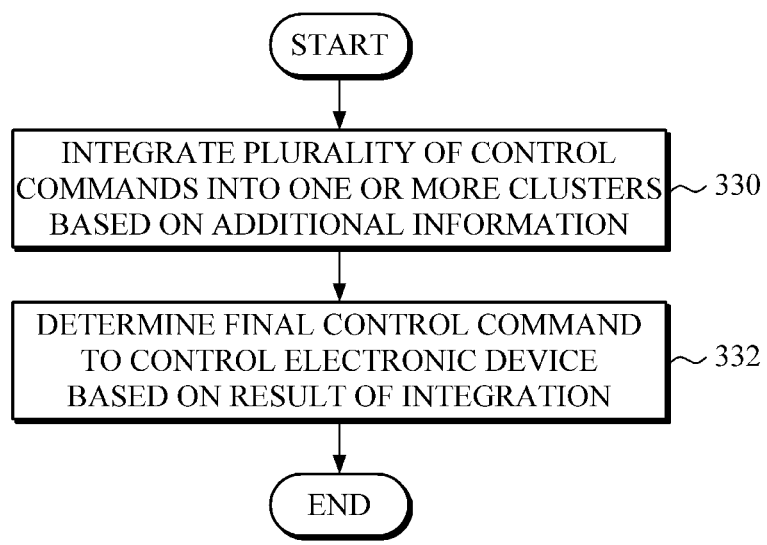

FIG. 3B is a diagram showing an example of the command integration step (330) of FIG. 3A. The operations in FIG. 3B may be performed in the sequence and manner as shown, although the order of some operations may be changed or some of the operations omitted without departing from the spirit and scope of the illustrative examples described. Many of the operations shown in FIG. 3B may be performed in parallel or concurrently. In addition to the description of FIG. 3B below, the above descriptions of FIGS. 1-3A, are also applicable to FIG. 3B, and are incorporated herein by reference. Thus, the above description may not be repeated here.

In 331, the control command processing apparatus 100 may classify a plurality of control commands using additional information tagged to a plurality of control commands to integrate the control commands into one or more clusters. In 332, the control command processing device 100 may determine a final control command to be executed by an electronic device based on the integration. In an example, the control command processing device 100 may determine the final control command by utilizing a clustering criterion or the additional information.

When the plurality of control commands are found to be redundant as a result of the integration, the control command processing device 100 may interact with a user to send a query about the processing of the redundant commands to the user and receive a response to the query from the user. In 332, the control command processing device 100 determines the final control command on the basis of the user's response.

In an example, as described above, when there are a plurality of agents, the control command processing device 100 may select an agent to interact with the user on the basis of various predetermined selection criteria.

Figure 4:
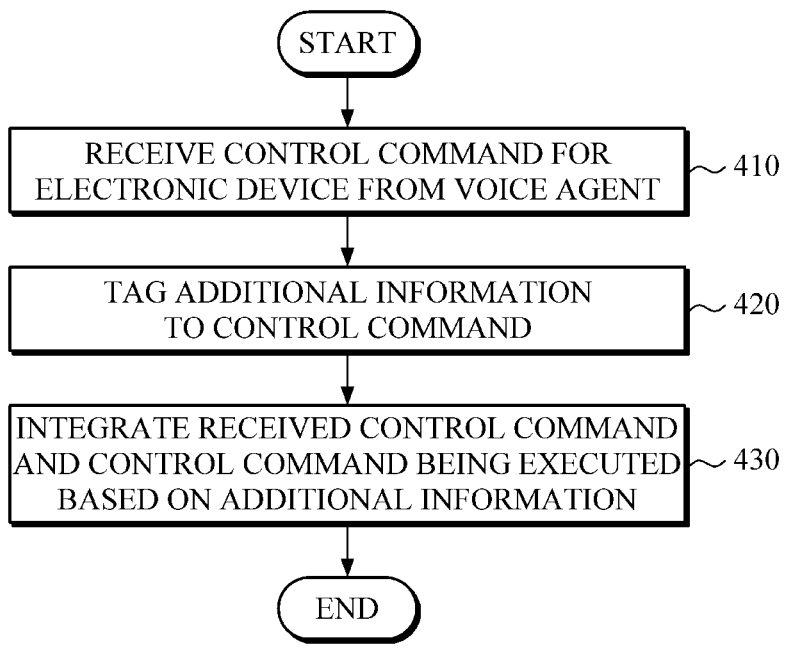
FIG. 4 is a diagram showing a method of processing a control command according to an embodiment.

FIG. 4 is a diagram showing a method of processing a control command according to another embodiment. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. In addition to the description of FIG. 4 below, the above descriptions of FIGS. 1-3, are also applicable to FIG. 4, and are incorporated herein by reference. Thus, the above description may not be repeated here.

In 410, the control command processing device 100 may receive a control command from a voice agent.

In 420, when the control command is received from the voice agent, the control command processing device 100 may tag additional information to the received control command.

In 430, the control command processing device 100 may integrate the received control command and a control command being executed. For example, when the control command is received, the control command processing device 100 may check an electronic device to be controlled and a control time using the additional information tagged to the received control command, extract a control command being executed by the electronic device from the command DB by utilizing the checked information, and integrate the control commands. In an example, when it is determined that the integrated control commands, i.e., the control command received from the voice agent and the control command being executed, conflict with each other, the control command processing device 100 may determine only one command as a final control command to enable the final control command to be executed by the electronic device.

In an example, the control command processing device 100 may determine whether the received control command and the control command being executed conflict with each other by referencing the command DB for storing control commands being executed by various electronic devices. In another example, the control command processing device 100 may send a query about the processing of the conflict to a user by interacting with the user and may determine one control command as the final control command on the basis of the user's response. In an example, when there are a plurality of voice agents, the control command processing device 100 may select an agent to perform the interaction by referencing the policy DB.

FIGS. 5 to 10 show examples of a network control system to which the above-described control command processing apparatus is applied.

Figure 5:
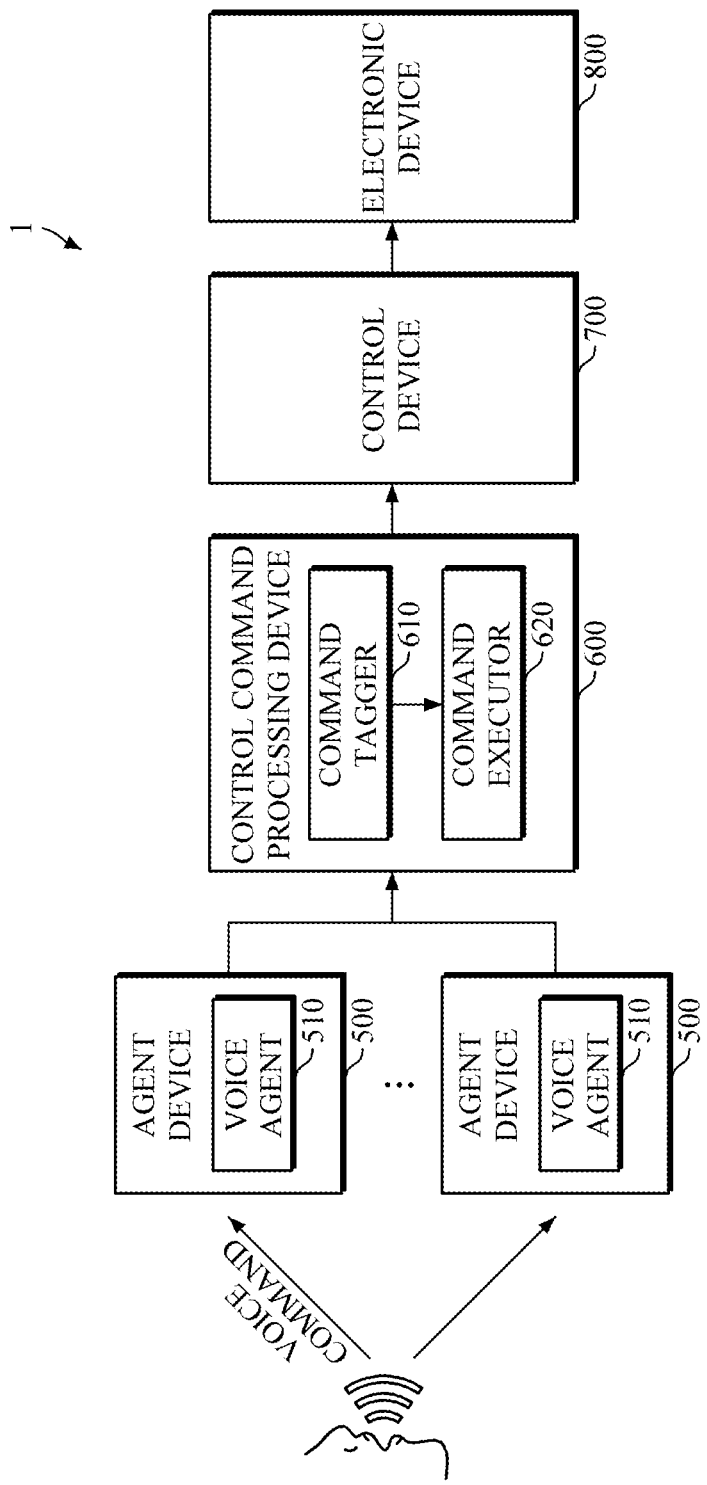

Referring to FIGS. 5 to 10, each of network control apparatuses 1, 2, 3, 4, 5, and 6 according to an embodiment may include a plurality of agent devices 500, a control device 700, and an electronic device 800. The plurality of agent devices 500 may each include a voice agent 510. The control device 700 controls the electronic device 800 according to a control command transferred from the agent device 500. The electronic device 800 performs an operation under the control of the control device 700. Also, the network control apparatuses 1, 2, 3, 4, 5, and 6 include the above-described control command processing device 100. As shown in FIG. 5, a control command processing device 600 may be implemented in a separate hardware device from the other devices 500, 700, and 800. In other examples, as shown in FIGS. 6 to 10, elements 610 and 620 of the control command processing device 600 may be installed in one of the other devices 500, 700, and 800 or may be distributed and installed in two or more devices.

Referring to FIG. 5, the control command processing device 600 in the network control apparatus 1 may be connected with the plurality of agent devices 500 and the control device 700 over a wired or wireless network. In an example, the devices 500, 600, 700, and 800 may include short-range communication modules, such as a wireless local area network (LAN) (e.g., Wi-Fi), Bluetooth, Zigbee, Near Field Communication (NFC), etc., mobile communication modules, and various other network communication modules, and may be connected to each other by controlling the communication modules.

For example, when a user enters a voice to request temperature control for a boiler, such as "increase the living-room temperature by one degree," a voice agent 510 of an agent device 500 positioned in the vicinity of the user may receive the user's voice and perform the necessary processing. For example, when the voice agent 510 included in the agent device 500 is equipped with voice recognition technology, the voice agent 510 may perform voice recognition to convert the voice into text and send a text-type control command to the control command processing device 600. In another example, when the voice agent 510 is not equipped with voice recognition technology, or according to a policy, the voice agent 510 may also send the voice entered by the user to the control command processing device 600 as the control command. In an example, the policy may be predetermined.

In this case, when the user's voice is received, the voice agent 510 may acquire and transfer information such as, for example, a signal strength of the received voice, information regarding the user, a time at which the user's voice is received to the control command processing device 600 in addition to the control command. In an example, when the voice recognition is performed, the voice agent 510 may additionally transfer information regarding accuracy of the voice recognition.

In an example, the agent device 500 may control a communication module installed therein to access a communication network, connect to the control command processing device 600 that accesses the communication network, and send the control command or the acquired information to the control command processing device 600.

The control command processing device 600 may integrate the control commands sent from the agent device 500 and may send one control command obtained as a result of the integration to the control device 700. In an example, the control command processing device 600 may include a command tagger 610 and a command executor 620. The command tagger 610 may tag additional information to a received control command. The command executor 620 may integrate a plurality of control commands on the basis of the tagged additional information to perform processing such that only one control command that is not redundant is executed by an electronic device.

In an example, when a control command is being executed by an electronic device to be controlled, the command executor 620 may perform the integration in consideration of the control command currently being executed.

When the received control command is redundant or conflicts with the control command being executed, the command executor 620 may select the agent device 500 to perform an interaction from among the plurality of agent devices 500 to interact with the user and may determine one control command as the final control command based on the interaction with the user.

When the control command is received from the control command processing device 600, the control device 700 may perform control such that the received control command is executed by the electronic device 800. In an example as shown in FIG. 5, the control device 700 is implemented in a separate hardware device from the electronic device. In other examples, the control device 700 may be installed in the electronic device 800 as a software module or hardware module.

The electronic device 800 may be paired with the control device 700 and may perform an operation corresponding to the control command received from the control device 700.

In an example, the control device 700 or the electronic device 800 may send a result of the execution of the control command, for example, a result such as "the living-room temperature is set to increase from 20 degrees Celsius to 21 degrees Celsius," and the command executor 620 of the control command processing device 600 may provide the result to the user through the agent device 500. In an example, the voice agent 510 of the agent device 500 may convert the received result into voice and output the voice to the user. In another example, the voice agent 510 of the agent device 500 may convert the received result into text and display the text to the user.

Figure 6:
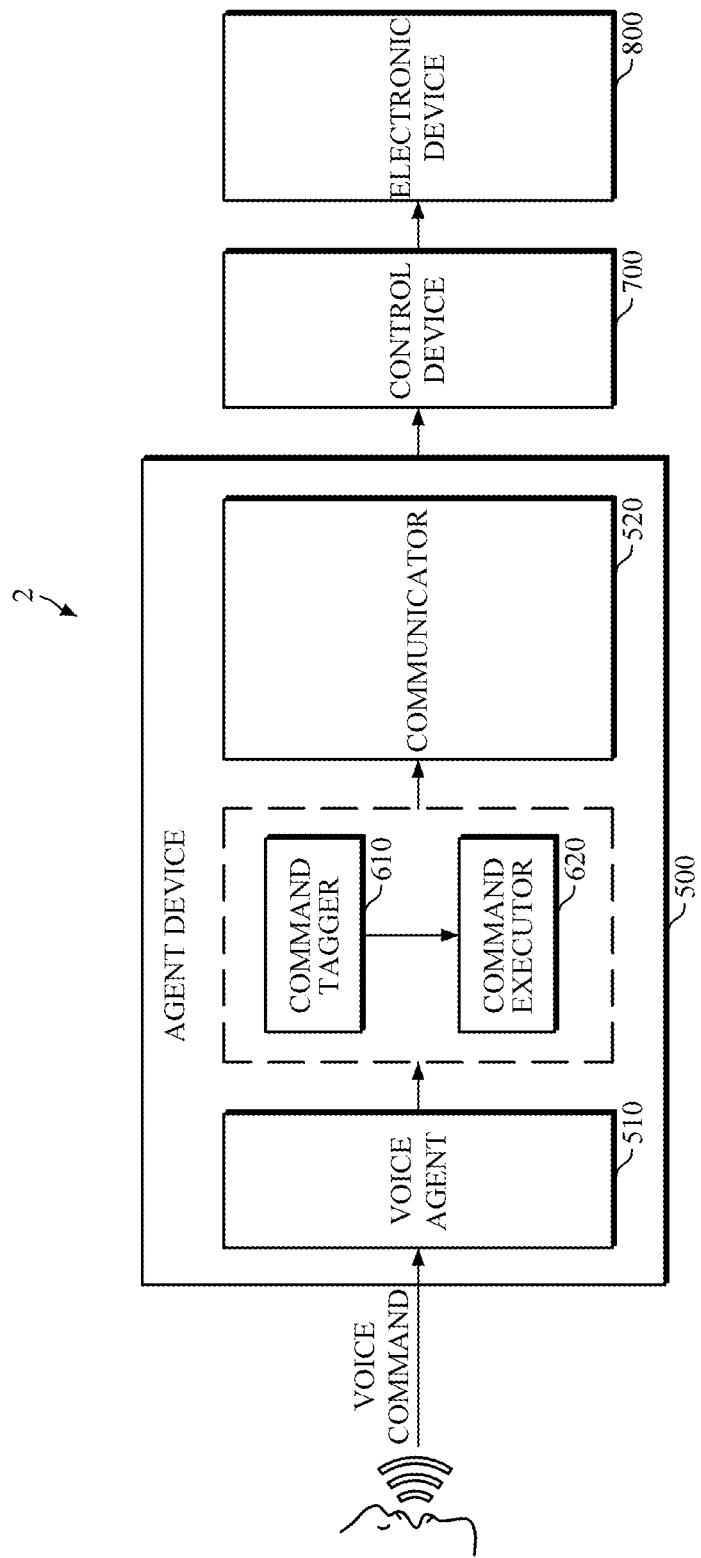

The network control apparatus 2 according to another embodiment will be described with reference to FIG. 6. According to an embodiment of FIG. 6, the control command processing device may be installed in the agent device 500. As described above, the network control apparatus 2 includes one or more agent devices 500, the control device 700, and the electronic device 800. Elements having the same reference numbers as those in FIG. 5 perform the similar functions, and detailed descriptions thereof will be omitted.

The agent device 500 may include a voice agent 510 for receiving a voice from a user, a communicator 520, and a command tagger 610 and a command executor 620 which are elements of the control command processing device.

When the voice is entered received from the user through a microphone or the like, the agent device 500 may perform a task such as voice recognition on the user's voice through the voice agent 510, determine one final control command through the command executor 620, and send the final control command to the control device 700 through the communicator 520. In an example, when the agent device 500 receives a plurality of voices uttered from multiple users at almost the same time, the voice agent installed in the agent device 500 may transfer each of the plurality of voices to the command tagger 610 as the control command. The command tagger 610 and the command executor 620 may solve the redundancy between the received control commands or the conflict of the received control commands with a command being executed in order to control the electronic device 800.

For example, when a user who feels that a living room is cold utters a voice command to "increase the living-room temperature by one degree" at 19:01, and a user who feels that the living room is hot utters a voice command to "decrease the living-room temperature by one degree" at 19:02, the agent device 500 may determine only one command as a final control command according to various criteria and send the determined final control command to the control device 700. In an example, the criteria may be predetermined. For example, the agent device 500 may determine the control command that is received later as the final control command or send a query about which command to finally execute to the user through the voice agent 510 and then determine the command selected by the user as the final control command, and may send the determined final control command to the control device 700. The communicator 520 may access a communication network to attempt to connect to the control device 700 according to a request of the command executor 620. When the connection is successful, the communicator 520 may send the determined final control command to the control device 700.

The control device 700 may perform control such that the received control command may be executed by the electronic device 800, and the electronic device 800 may perform an operation required by the user under the control of the control device 700.

Figure 7:
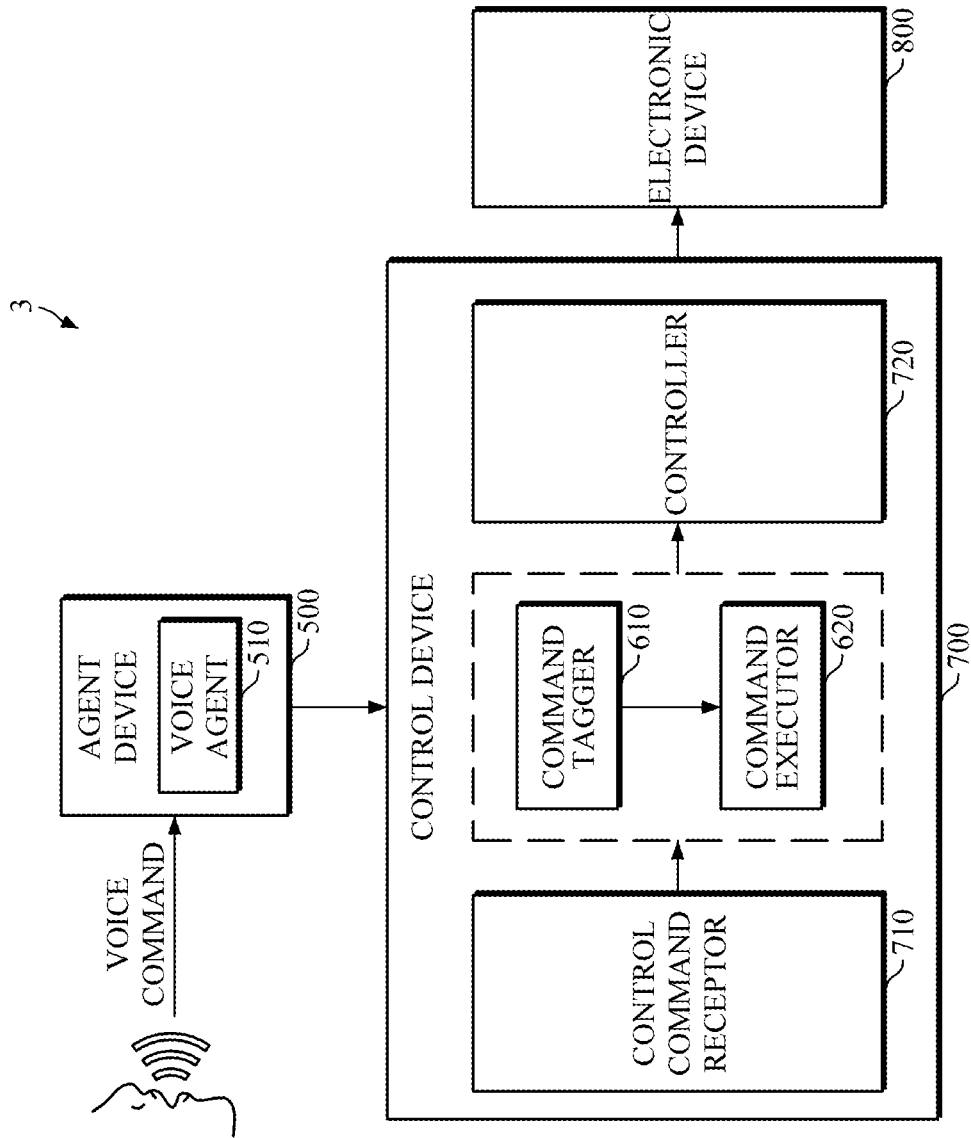

FIG. 7 shows the network control apparatus 3 according to an embodiment. According to an embodiment of FIG. 7, elements 610 and 620 of a control command processing device may be installed in the control device 700. Likewise, the network control apparatus 3 may include one or more agent devices 500, the control device 700, and the electronic device 800. Elements having the same reference numbers as those in FIGS. 5 and 6 perform similar functions, and detailed descriptions thereof will be omitted.

Each of the agent devices 500 includes a voice agent 510. The control device 700 may include a control command receptor 710 for receiving a control command from the agent device 500, a command tagger 610, a command executor 620, and a controller 720.

When a plurality of control commands are received from the agent device 500 through the control command reception unit 710, the control device 700 may integrate the received plurality of control commands and control commands being executed through the command tagger 610 and the command executor 620 to determine a final control command to be executed by the electronic device 800. The control device 700 may perform control such that the final control command is executed by the electronic device 800 through the control unit 720.

Figure 8:
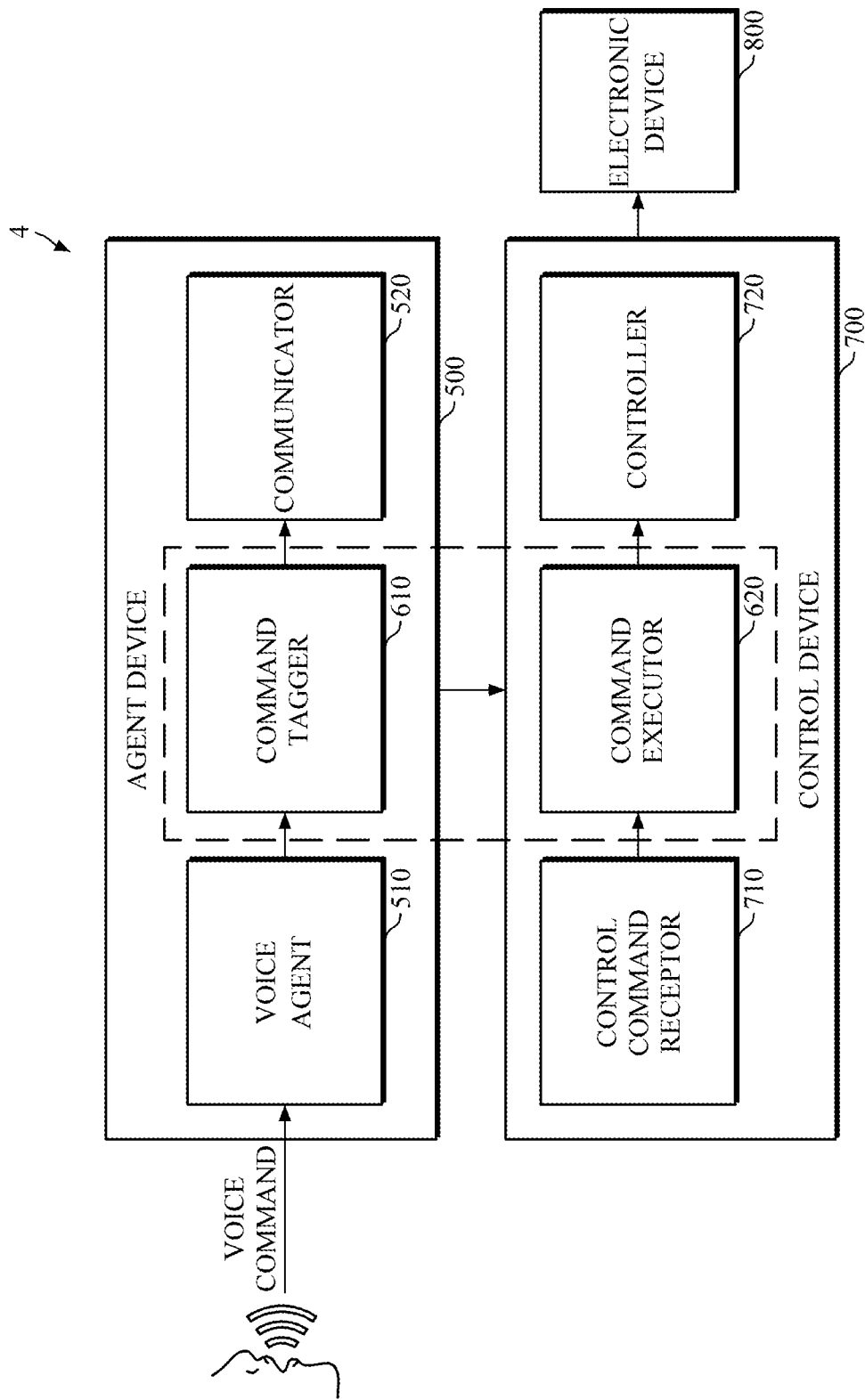
Figure 9:
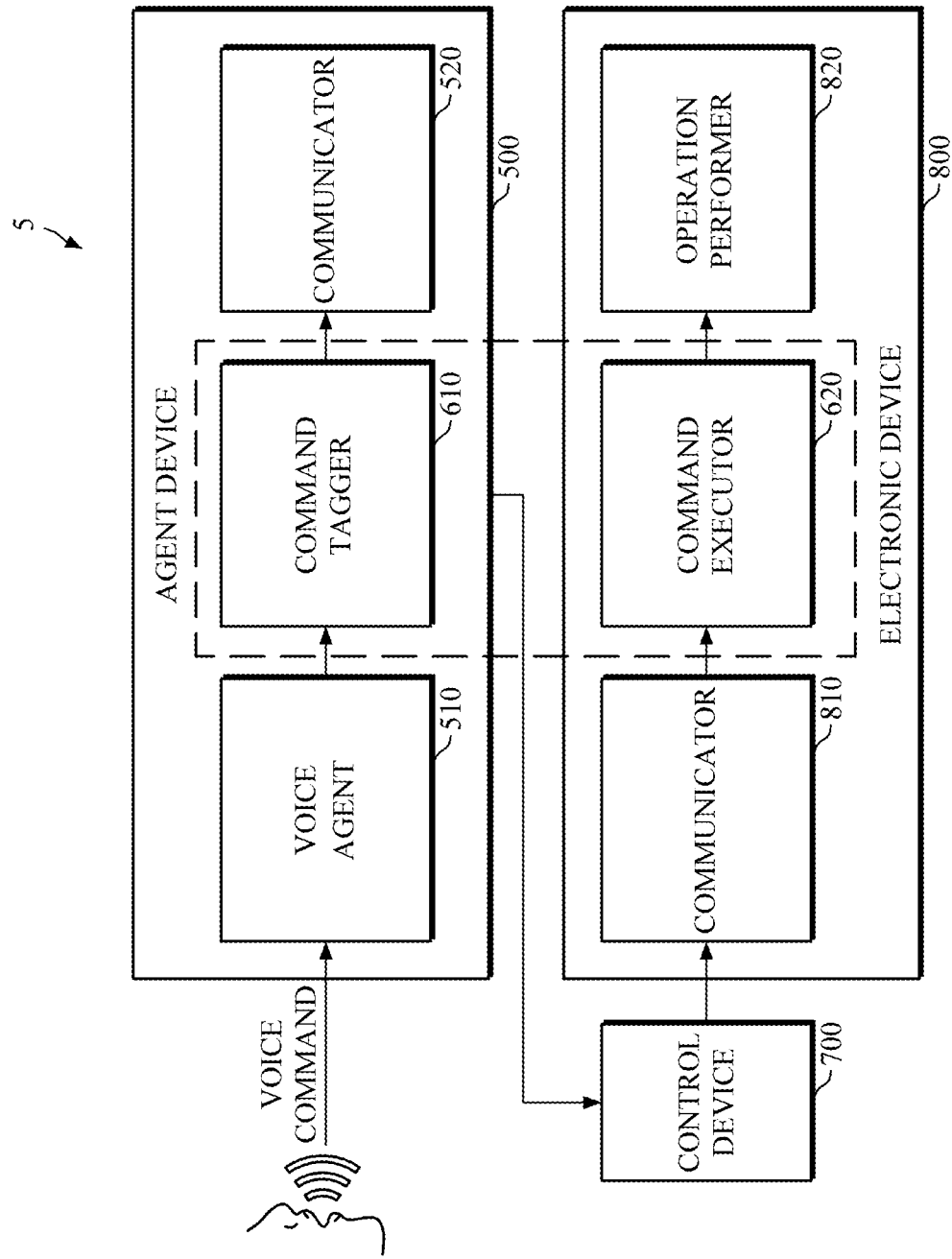

FIGS. 8 and 9 show the network control apparatuses 4 and 5 according to other embodiments. Each of the network control systems 4 and 5 according to embodiments of FIGS. 8 and 9 may include the agent device 500, the control device 700, and the electronic device 800. Elements 610 and 620 of a control command processing device may be distributed and installed in different devices. Elements having the same reference numbers as those in FIGS. 5-7 perform similar functions, and detailed descriptions thereof will be omitted.

Referring to FIG. 8, in the network control apparatus 4, the command tagger 610 and the command executor 620 may be distributed and installed in the agent device 500 and the control device 700, respectively. In this case, a control command reception unit 710 of the control device 700 may receive a control command to which additional information is tagged by the command tagger 610 of the agent device 500, and the received control command may be integrated by the command executor 620 and executed by the electronic device 800 through a control unit 720.

Referring to FIG. 9, in the network control apparatus 5, the command tagger 610 and the command executor 620 may be distributed and installed in the agent device 500 and the electronic device 800, respectively. In this case, when the control device 700 sends a plurality of control commands to which additional information is tagged by the agent device 500 and pre-registered control commands to be executed, the electronic device 800 may integrate the control commands and execute only one command. For example, a communicator 810 of the electronic device 800 may access a home network communication network to connect to the control device 700 and may receive control commands from the control device 700 and transfer the received control commands to the command executor 620. In an example, the command executor 620 may integrate the received commands and may determine and execute one final control command.

Also, although not shown, the command tagger may be installed in the agent device 500, and the command executor 620 may be installed in a separate control command processing device. However, other arrangements of the command tagger, command executor, agent device, controller, control command processing device, and electronic device are considered to be well within the scope of the present disclosure.

FIG. 10 shows the network control apparatus 6 according to an embodiment. According to an embodiment of FIG. 10, elements 610 and 620 of a control command processing device may be installed in the electronic device 800. The network control system 6 may include the agent device 500, the control device 700, and the electronic device 800. The electronic device 800 may include a communicator 810, a command tagger 610, a command executor 620, and an operation performer 820. When the communicator 810 of the electronic device 800 receives a plurality of control commands from the control device 700, a final control command is determined by the command tagger 610 and the command executor 620, and the determined final control command is performed by the operation performer 820. Detailed description thereof will be omitted.

Various embodiments to which a control command processing technique for integrating and processing a plurality of control commands is applied in a network control apparatus that controls an electronic device through a voice agent have been described. However, the present disclosure is not limited to the above-described embodiments, and may be modified in various manners without departing from the spirit and scope of the illustrative examples described.

The network control apparatuses 1, 2, 3, 4, 5, and 6, control command processing apparatus 100, agent devices 500, voice agent 510, control command processing device 600, command tagger 610, command executor 620, control device 700, electronic device 800, operation performer 820, command tagger 110, command executors 120, 120a, 120b, 120c, and 120d, command integrator 121, final-command determiner 122, interactor 123, agent selector 124, communicator 520, communicator 810, control command receptor 710, controller 720, command database (DB) 125, and policy DB 126 described in FIGS. 1, 2A-2D, and 5-10 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3A-3B and 4 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An electronic device for processing a control command, the electronic device comprising:
a processor configured to:

receive a plurality of control commands for the electronic device from a plurality of voice agents which receive a voice signal,
identify additional information related to each of the plurality of control commands, the additional information including a reception time of each of the plurality of control commands,
integrate the plurality of control commands into a plurality of clusters based on the reception time of each of the plurality of control commands,
identify whether there are at least two control commands in a first cluster of the plurality of clusters,
based on identifying that there are the at least two control commands in the first cluster, identify a single control command satisfying a predetermined criteria related to the first cluster among the at least two control commands, and
control the electronic device based on the single control command.

2. The electronic device of claim 1, wherein the received plurality of control commands are voice prompts or a texts into which the voice prompts are converted through voice recognition technology.

3. The electronic device of claim 1, wherein the additional information comprises a recognition accuracy of each of a plurality of voices corresponding to the plurality of control commands, a signal strength of each of the plurality of voices, a length of each of the plurality of control commands, a hash value extracted from each of the plurality of control commands, a feature value, information regarding a user, information regarding an agent device, and information regarding the electronic device.

4. The electronic device of claim 1, wherein the processor is further configured to:
calculate similarity between the plurality of control commands,
identify a plurality of contemporaneous control commands among the plurality of control commands based on the calculation of the similarity, and
integrate the plurality of contemporaneous control commands into the plurality of clusters based on the reception time of each of the plurality of control commands.

5. The electronic device of claim 1, wherein the processor is further configured to:
send a query about processing of a redundant command, in response to identifying the redundant command being present in the plurality of clusters,
identify another control command among the plurality of control commands based on a result of the query, and
control the electronic device based on the control command.

6. The electronic device of claim 1, wherein the processor is further configured to select a voice agent to interact with a user from among the plurality of voice agents, in response to receiving the plurality of control commands from the plurality of voice agents.

7. The electronic device of claim 6, wherein the processor is further configured to select the voice agent to interact with the user based on at least one of distances between the user and the voice agent, user preferences for the voice agent, frequencies of use of the voice agent, a voice signal strength, or voice recognition accuracy of the control commands received from the voice agent.

8. The electronic device of claim 1, wherein the processor is further configured to:
detect that at least one of a plurality of contemporaneous control commands is redundant, and
identify a final control command among the plurality of control commands to control the electronic device based on the integration, wherein the final control command is not the at least one of the plurality of contemporaneous control commands that is redundant.

9. A method of processing a control command for an electronic device, the method comprising:
receiving a plurality of control commands from a plurality of voice agents which receive a voice signal
identifying additional information related to each of the plurality of control commands, the additional information including a reception time of each of the plurality of control commands; and
integrating the plurality of control commands into a plurality of clusters based on the reception time of each of the plurality of control commands;
identifying whether there are at least two control commands in a first cluster of the plurality of clusters;
based on identifying that there are the at least two control commands in the first cluster, identifying a single control command satisfying a predetermined criteria related to the first cluster among the at least two control commands; and
controlling the electronic device based on the single control command.

10. The method of claim 9, wherein the integrating of the plurality of control commands into the plurality of clusters comprises:
calculating similarity between the plurality of control commands; and
performing the integration based on the calculated similarity and the reception time of each of the plurality of control commands.

11. The method of claim 9, further comprising:
sending a query about processing of a redundant command being present in the plurality of clusters;
identifying a final control command based on a result of the query; and
controlling the electronic device based on the final control command.

12. The method of claim 9, further comprising:
selecting a voice agent to interact with a user from among the plurality of voice agents, in response to receiving a plurality of contemporaneous control commands from the plurality of voice agents.

13. A non-transitory computer-readable storage medium storing instructions that, when executed by a processor, cause the processor to perform the method of claim 9.

14. The method of claim 9, further comprising:
detecting that at least one of a plurality of contemporaneous control commands is redundant; and
identifying a final control command among the plurality of control commands to control the electronic device based on the integration, wherein the final control command is not the at least one of the plurality of contemporaneous control commands that is redundant.

* * * * *